W. L. WHITE.
LATHE CHUCK RELEASE.
APPLICATION FILED APR. 29, 1908. RENEWED FEB. 9, 1909.

931,167.

Patented Aug. 17, 1909.

UNITED STATES PATENT OFFICE.

WILLIAM LITTELL WHITE, OF CYNWYD, PENNSYLVANIA, ASSIGNOR TO THE S. S. WHITE DENTAL MFG. CO., OF PHILADELPHIA, PENNSYLVANIA.

LATHE-CHUCK RELEASE.

No. 931,167.            Specification of Letters Patent.           Patented Aug. 17, 1909.

Application filed April 29, 1908, Serial No. 429,939.    Renewed February 9, 1909.    Serial No. 477,020.

*To all whom it may concern:*

Be it known that I, WILLIAM LITTELL WHITE, a citizen of the United States, residing at Cynwyd, in the county of Montgomery and State of Pennsylvania, have invented a certain new and useful Improvement in Lathe-Chuck Releases; and I do hereby declare the following to be a full, clear, and exact description of the invention, such as will enable others skilled in the art to which it appertains to make and use the same.

My invention relates to releasing or detaching devices for lathe chucks and is particularly applicable to electric lathes such as used by dentists.

The object of my invention is to provide a device of this character by means of which chucks may be quickly and conveniently released or detached from the ends of the tapered lathe shafts.

The invention will be fully described in the following specification, illustrated in the accompanying drawing, and pointed out in the claim at the conclusion of said specification.

Figure 1:
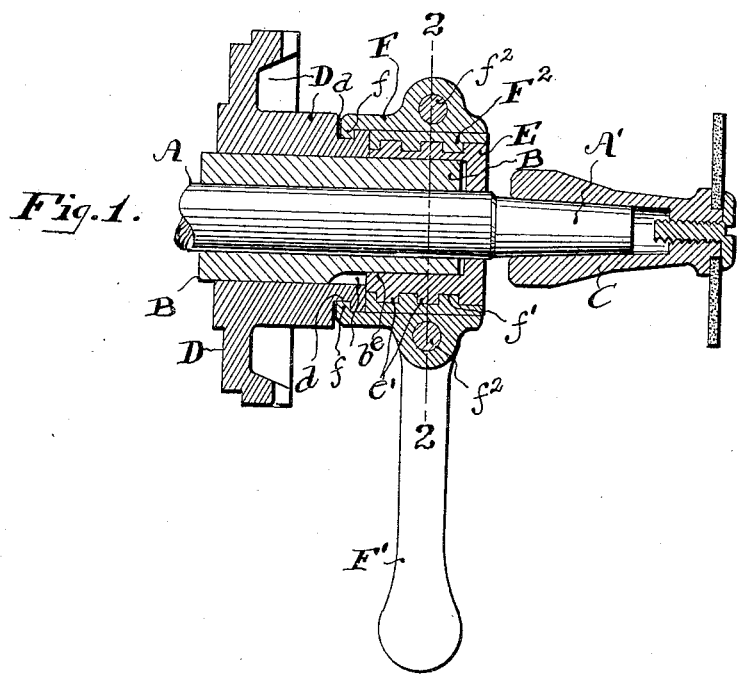
Figure 2:
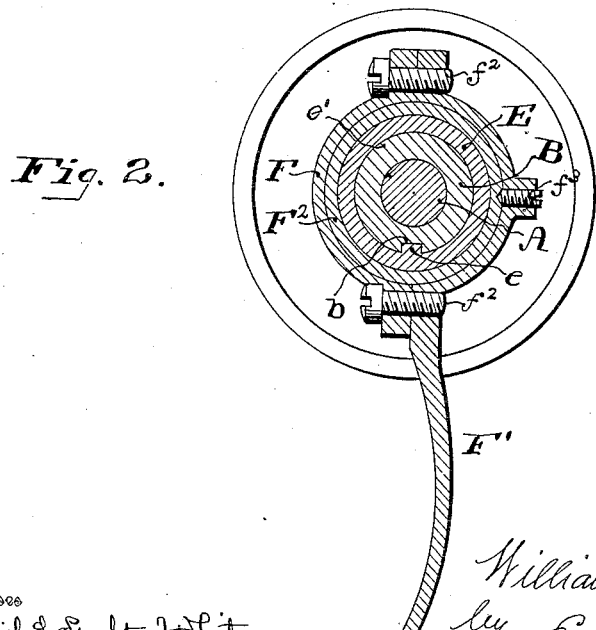

In said drawing Figure 1 is a longitudinal central sectional view and Fig. 2 a transverse sectional view on the line 2—2 of Fig. 1.

The shafts of dental and similar electric and foot lathes usually project from opposite ends of the lathe, and are tapered for the reception of chucks having correspondingly tapered sockets. By driving the chuck onto the tapered end of the shaft it is firmly secured thereon and considerable force is required to detach it. Various means forming part of the lathe have been devised for detaching or releasing the chuck from the shaft. The means which I have devised will now be described.

A represents a portion of the lathe shaft, the tapered end A' of which projects beyond the end of the shaft bearing B and C represents an ordinary lathe chuck secured on said shaft in the usual manner. The shaft bearing B projects beyond the lathe head which is indicated at D, said bearing and said head both having fixed relation to the lathe. A longitudinally movable sleeve E, which I will designate the "thrust sleeve," surrounds the bearing B and is prevented from turning thereon by means of a spline $e$ fitting in a groove $b$ in the exterior surface of said bearing. Thus, the thrust sleeve may be moved longitudinally of the shaft but it cannot turn. An actuating sleeve F provided with a handle F' surrounds the thrust sleeve and is so connected to the lathe as to be capable of being turned, but is incapable of being moved longitudinally. This may be accomplished by forming the actuating sleeve with an annular flange $f$ which fits in an annular groove $d$ in the lathe head D. By providing suitable cam or screw connection between the thrust and actuating sleeves the former is reciprocated by turning of the latter. That is to say, when the actuating sleeve is turned or rotated in one direction the thrust sleeve is projected, and when said actuating sleeve is rotated in the opposite direction the thrust sleeve is retracted. The operating connection between the thrust and actuating sleeves may consist, as shown, of an external thread $e'$ on the thrust sleeve and an internal thread $f'$ on the actuating sleeve.

For the purpose of simplifying manufacture the threaded or cam portion of the actuating sleeve may be separate from said sleeve. In other words the actuating sleeve may consist of an inner section $F^2$ internally threaded as at $f'$ or formed with a suitable cam, and an outer section F split longitudinally, the two parts of the outer section being united by connecting screws $f^2$ $f^2$. A set screw $f^3$ serves to unite the outer and inner sections and causes them to rotate together. In assembling the parts the inner section $F^2$ is screwed upon the thrust sleeve which is slipped onto the bearing B; the two halves of the outer section of the actuating sleeve are then brought together around the inner section thereof, with the flange $f$ fitting in the annular groove $d$ of the lathe head D, after which the connecting screws $f^2$ and set screws $f^3$ are inserted.

In the operation of a lathe provided with my improved chuck release the chuck is placed on the shaft as usual with lathes of this class, the thrust sleeve being retracted. When it is desired to remove the chuck, which often becomes tightly wedged upon the shaft and is then exceedingly difficult to dislodge, the handle F is grasped by the hand and the actuating sleeve given a partial rotation. The effect of this is to project the thrust sleeve, which as it is thrust outwardly comes in contact with the chuck and forces it from the shaft. By reason of the threaded or cam-like operative connection between the thrust sleeve and the actuating sleeve, and also by reason of the handle with which the latter is provided, considerable force may be exerted against the chuck with but slight effort on the part of the operator. Moreover the amount of movement necessary to be given the handle for releasing the chuck is but slight, a partial turn usually being sufficient.

I claim as my invention:—

In a lathe chuck release the combination of the tapered shaft, the bearing therefor, an endwise movable thrust sleeve surrounding said bearing, a rotatable actuating sleeve surrounding said thrust sleeve and provided with a handle, and an operative connection between said sleeves whereby the thrust sleeve is moved endwise when the actuating sleeve is rotated.

In testimony whereof I affix my signature in presence of two witnesses.

. WILLIAM LITTELL WHITE.

Witnesses:
 HORACE D. REEVE,
 GEORGE A. BOWER.